(No Model.) 2 Sheets—Sheet 1.
N. L. LE TURCQ DES ROSIERS.
PROCESS OF COLLECTING THE AROMATIC AND VOLATILE
SUBSTANCES FROM COFFEE.

No. 449,758. Patented Apr. 7, 1891.

Witnesses:
John M. Speer.
Livingston Emery

Inventor:
Nicolas Lucien Le Turcq des Rosiers
by Briesen & Knauth
his Attorneys.

(No Model.) 2 Sheets—Sheet 2.

N. L. LE TURCQ DES ROSIERS.
PROCESS OF COLLECTING THE AROMATIC AND VOLATILE SUBSTANCES FROM COFFEE.

No. 449,758. Patented Apr. 7, 1891.

UNITED STATES PATENT OFFICE.

NICOLAS LUCIEN LE TURCQ DES ROSIERS, OF ETAIN, FRANCE.

PROCESS OF COLLECTING THE AROMATIC AND VOLATILE SUBSTANCES FROM COFFEE.

SPECIFICATION forming part of Letters Patent No. 449,758, dated April 7, 1891.

Application filed March 26, 1890. Serial No. 345,396. (No model.) Patented in France August 28, 1889, No. 200,452.

*To all whom it may concern:*

Be it known that I, NICOLAS LUCIEN LE TURCQ DES ROSIERS, residing at Château de Moulainville par Etain, (Meuse,) France, have invented Improvements Connected with Roasting Coffee and other Substances, (for which I have obtained Letters Patent in France for fifteen years, dated August 28, 1889, No. 200,452,) of which the following is a full, clear, and exact description.

The chief object of my invention is the production of coffee possessing qualities superior to those possessed by coffees prepared by any other known process. This result is attained by augmenting the proportion of caffeine and caffeone ordinarily contained in roasted coffee, which I am enabled to do by the employment of means for effecting the condensation of the vapors as they pass from the roaster in such manner that those only which are of service are collected and added to the berries, while those which do not possess any tonic properties are discharged into the atmosphere before being allowed to condense.

The improved process of my invention may be carried into effect by means of the condenser, hereinafter described, and illustrated in the accompanying drawings, by which the automatic separation of the vapors is produced under such conditions that only the useful principles contained in the roasted coffee are collected, as above mentioned. The process is based on the free condensation of the vapors in the air as they pass from the roaster, the apparatus being so constructed that the temperature can never fall sufficiently low to condense the vapors of the pyridic and other substances which are to be got rid of.

Figure 1:
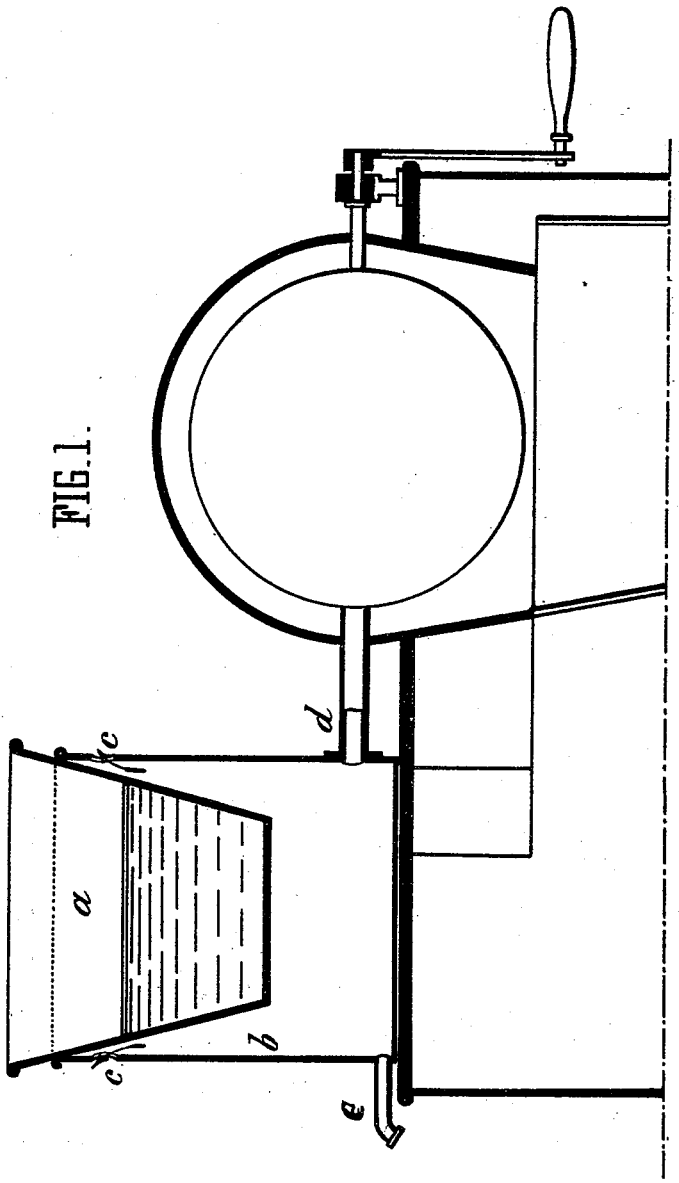
Figure 2:
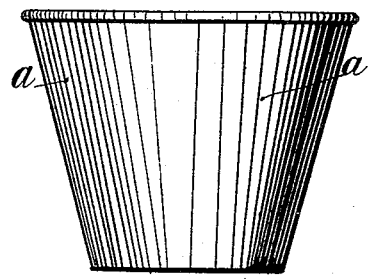
Figure 3:
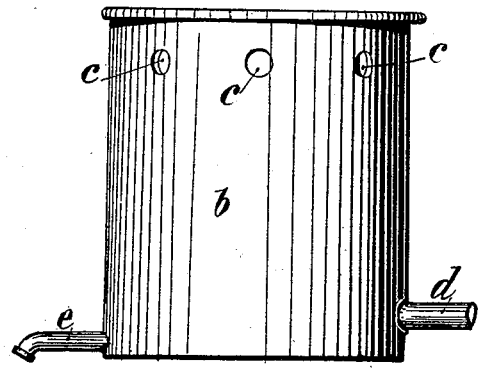

Figure 1 of the drawings represents, by way of example, the combination of the condenser with a coffee-roaster of any desired kind, while Figs. 2 and 3 represent details of the condenser for effecting the condensation and collection of the products; but it will be understood that the details of construction of the condenser may be varied to any desired extent.

$a$, Fig. 2, is a vessel, provided or not with a cover, to contain water or other liquid for regulating the condensation, which is maintained at a temperature of about 212° Fahrenheit. The liquid in this vessel may be renewed at intervals, or a circulation of hot water may be established in such manner as to maintain the walls of the vessel at the exact temperature required to insure the automatic separation of the vapors according to their respective points of condensation. The vessel $a$ (whose surface may be increased by corrugations, flutes, &c.) fits into the mouth of a cylinder $b$, Fig. 3, which has around its upper part a series of orifices $c$ in any suitable number and position, or is formed with a rim, upon which the vessel $a$ rests, having ribs or projections between which the vapors can escape. The cylinder $b$ connects at its base with the roaster by pipe $d$, through which the vapors pass into the cylinder, and it is provided with another pipe $e$ for running off the condensed liquid products which collect therein.

It will be understood by what has preceded that the temperature in cylinder $b$ never much exceeds 212° Fahrenheit. Now it has been found by experiment that of the vapors which escape from coffee in roasting caffeine and coffeone alone condense below that temperature, and the result of this is that those which remain in the form of vapor pass away into the atmosphere through the orifices $c$. In this manner an automatic separation of the vapors is effected wholly independent of the action of the roaster. The caffeine and caffeone are collected in a liquid form at $e$ and are afterward mixed with the roasted coffee-berries while they are still sufficiently hot to vaporize the water contained by means of any suitable apparatus provided with an injector and stirrer. These products become reassimilated to a remarkable degree with the berries without sensibly increasing the weight of the coffee and furnish a relatively high proportion of those elements which impart to the coffee its tonic properties.

My invention may also be applied to the roasting of any substances to be roasted—such as cacao, cocoa, and other grains or vegetables and other matters.

I claim—

The herein-described process of effecting the separation of vapors which are thrown off from a torrefactor of coffee-beans or the like during the roasting operation, which process consists in conducting the vapors to a dry separating-chamber wherein the temperature is maintained at about 212° Fahrenheit, and in simultaneously throwing off into the open air from said dry separating-chamber the pyridic or other deleterious gases and condensing the caffeine and caffeone or other useful gases, substantially as and for the purpose specified.

The foregoing specification of my improvements connected with roasting coffee and other substances signed by me this 3d day of March, 1890.

NICOLAS LUCIEN LE TURCQ DES ROSIERS.

Witnesses:
R. J. PRESTON,
ERNEST TISSIER.